United States Patent
Shen et al.

(10) Patent No.: US 10,922,515 B2
(45) Date of Patent: Feb. 16, 2021

(54) INTEGRATED FINGERPRINT AND FORCE SENSOR

(71) Applicant: SYNAPTICS INCORPORATED, San Jose, CA (US)

(72) Inventors: Guozhong Shen, San Jose, CA (US); Taehee Cho, San Jose, CA (US); Yongqian Tang, San Jose, CA (US); Mandar Kulkarni, San Jose, CA (US); Ozan Ersan Erdogan, San Jose, CA (US); Shubha Ramakrishnan, San Jose, CA (US); Pascale El Kallassi, Menlo Park, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 292 days.

(21) Appl. No.: 15/953,056

(22) Filed: Apr. 13, 2018

(65) Prior Publication Data

US 2018/0300522 A1    Oct. 18, 2018

Related U.S. Application Data

(60) Provisional application No. 62/485,756, filed on Apr. 14, 2017.

(51) Int. Cl.
*G06K 9/00*    (2006.01)

(52) U.S. Cl.
CPC ....... *G06K 9/0002* (2013.01); *G06K 9/00087* (2013.01)

(58) Field of Classification Search
None
See application file for complete search history.

(56) References Cited

U.S. PATENT DOCUMENTS

| | | | | |
|---|---|---|---|---|
| 8,621,941 | B2* | 1/2014 | Mei | G06F 3/0338 73/862.044 |
| 10,032,592 | B2* | 7/2018 | Brooks | H01H 89/00 |
| 2010/0253645 | A1* | 10/2010 | Bolender | G06F 3/0414 345/174 |
| 2010/0308844 | A1* | 12/2010 | Day | G06F 3/045 324/663 |
| 2015/0071509 | A1* | 3/2015 | Myers | G06K 9/0002 382/124 |
| 2015/0242057 | A1* | 8/2015 | Galela | G06F 3/0428 345/175 |
| 2016/0240605 | A1* | 8/2016 | Lee | H01L 27/3276 |
| 2017/0091507 | A1* | 3/2017 | Setlak | G06K 9/0002 |
| 2017/0357354 | A1* | 12/2017 | Lim | G06F 3/0412 |

\* cited by examiner

*Primary Examiner* — Harshad R Patel
*Assistant Examiner* — Nigel H Plumb
(74) *Attorney, Agent, or Firm* — Patterson + Sheridan, LLP

(57) ABSTRACT

An integrated sensing device comprising a force sensor and fingerprint sensor disposed on different portions of a flexible circuit. The fingerprint sensor is disposed on a first side of a first portion of the flexible circuit and the force sensor is disposed on a second portion of the flexible circuit. The flexible circuit is configured such that the first portion is over the second portion. The fingerprint sensor includes fingerprint sensor electrodes disposed on the first side of the first portion. The force sensor comprises a compressible layer disposed between a second side of the first portion and a first side of the second portion, and one or more one force electrodes.

20 Claims, 9 Drawing Sheets

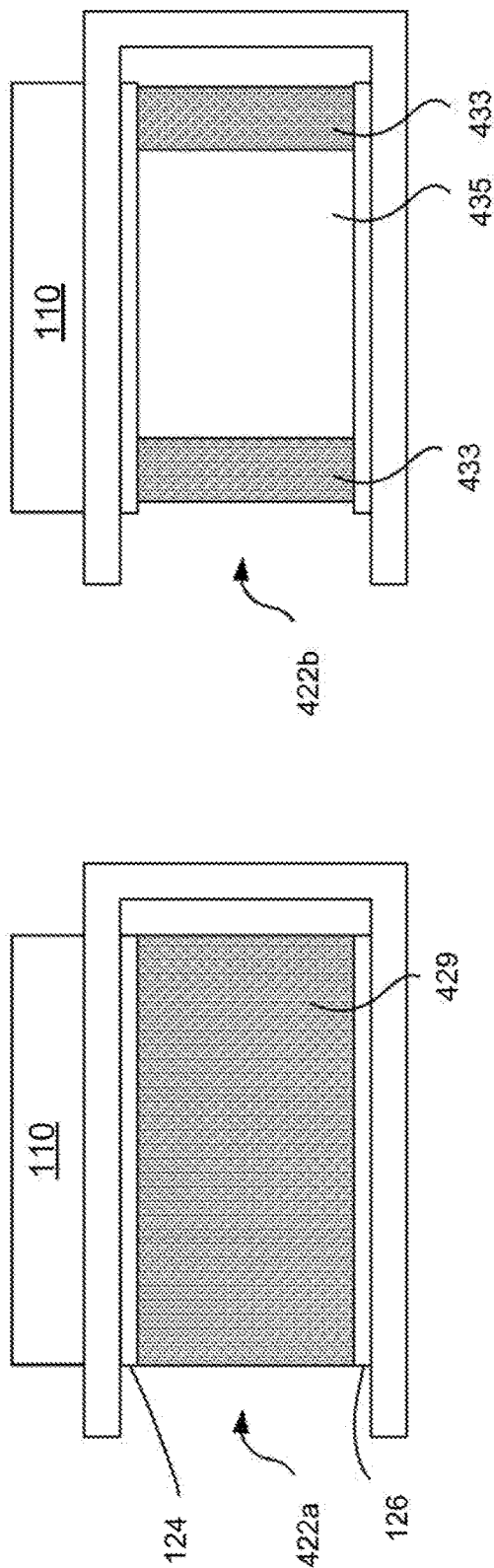
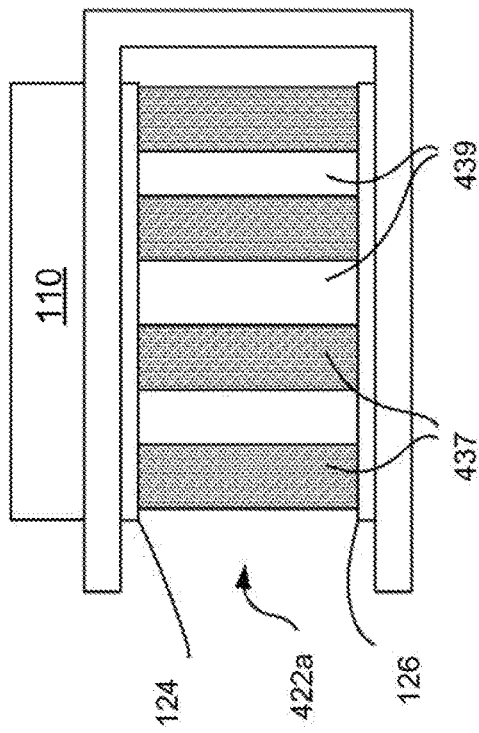

INTEGRATED FINGERPRINT AND FORCE SENSOR

CROSS-REFERENCE TO RELATED APPLICATIONS

This application claims benefit of U.S. provisional patent application Ser. No. 62/485,756, filed Apr. 14, 2017, entitled "INTEGRATED FINGERPRINT AND FORCE SENSOR", which is herein incorporated by reference in its entirety.

FIELD

The disclosure relates generally to fingerprint and force sensors, and, more specifically, to an input device comprising an integrated fingerprint and force sensor.

BACKGROUND

Fingerprint sensors are well known in the field of biometrics, and are used commonly for user identification in electronic devices such as laptops, personal computing devices, mobile phones, tablets, and the like. Typically, a fingerprint sensor comprises a one or two dimensional sensing array communicatively coupled to a controller.

In many embodiments, there is a desire to couple fingerprint sensors with buttons and other input devices. This allows the functionality of the fingerprint sensor to be linked with other input functions for improved usability, and it avoids the need to reserve space in an electronic device for a dedicated fingerprint sensor. Conventional approaches for coupling fingerprint sensors with other input devices include typically stacking a discrete fingerprint sensor over a mechanical tactile switch (e.g., a dome switch), thereby providing a mechanical button that a user can activate by depressing the fingerprint sensor against the mechanical switch.

Unfortunately, conventional approaches have significant shortcomings. For example, stacking the discrete fingerprint over the tactile switch can result in a relatively thick stack. Further, the need to have a mechanical switch present presents a design constraint that can affect other components of the electronic device. Additionally, approaches for integrating fingerprint sensors with other types of input devices tend to increase manufacturing or design complexity significantly.

SUMMARY

The following presents a simplified summary in order to provide a basic understanding of some aspects of the disclosed embodiments. This summary is not an extensive overview of the invention. It is not intended to identify key/critical elements of the invention or to delineate the scope of the invention. Its sole purpose is to present some concepts in a simplified form as a prelude to the more detailed description that is presented later.

In one embodiment, a force sensing device comprises a flexible circuit, a fingerprint sensor, and a force sensor. The flexible circuit comprises a first side having a first portion and a second portion, and a second side having a first portion and a second portion. The first portion of the first side is disposed over the second portion of the first side. The fingerprint sensor is disposed on the first portion of the second side and comprises a sensor package. The sensor package includes an integrated circuit, and fingerprint sensor electrodes communicatively coupled to the integrated circuit. The force sensor comprises a compressible layer disposed between the second portion of first side and the first portion of the first side, and one or more force electrodes.

In one embodiment, an input device comprises a flexible circuit, a force sensor, and a fingerprint sensor. The flexible circuit comprises a first side having a first portion and a second portion, and a second side having a first portion and a second portion. The first portion of the first side is disposed over the second portion of the first side. The force sensor comprises a compressible layer disposed between the second portion of the first side and the first portion of the first side, and one or more force electrodes. The fingerprint sensor is disposed on the first portion of the second side. The first portion of the second side opposes the first portion of the first side. The fingerprint sensor comprises a sensor package which includes fingerprint sensor electrodes, and an integrated circuit. The integrated circuit is communicatively coupled to the one or more force electrodes and the fingerprint sensor electrodes. The integrated circuit is configured to receive first resulting signals by driving the one or more force electrodes, determine force information based on the first resulting signals, receive second resulting signals by driving the fingerprint sensor electrodes, and determine fingerprint information based on the second resulting signals.

In one embodiment, a processing system comprises an integrated circuit disposed on a second side of a first portion of a flexible circuit. A first portion of a first side of the flexible circuit is disposed over a second portion of the first side. The integrated circuit is configured to receive first resulting signals by driving one or more force electrodes of a force sensor and second resulting signals by driving fingerprint sensor electrodes of a fingerprint sensor. The integrated circuit is further configured to determine force information based on the first resulting signals, and determine fingerprint information based on the second resulting signals. The force sensor comprises a compressible material disposed between the first portion of the first side and the second portion of the first side.

BRIEF DESCRIPTION OF DRAWINGS

FIGS. 4E-4G illustrate exemplary embodiments of the compressible layer according to embodiments of the disclosure.

DETAILED DESCRIPTION

Figure 1:
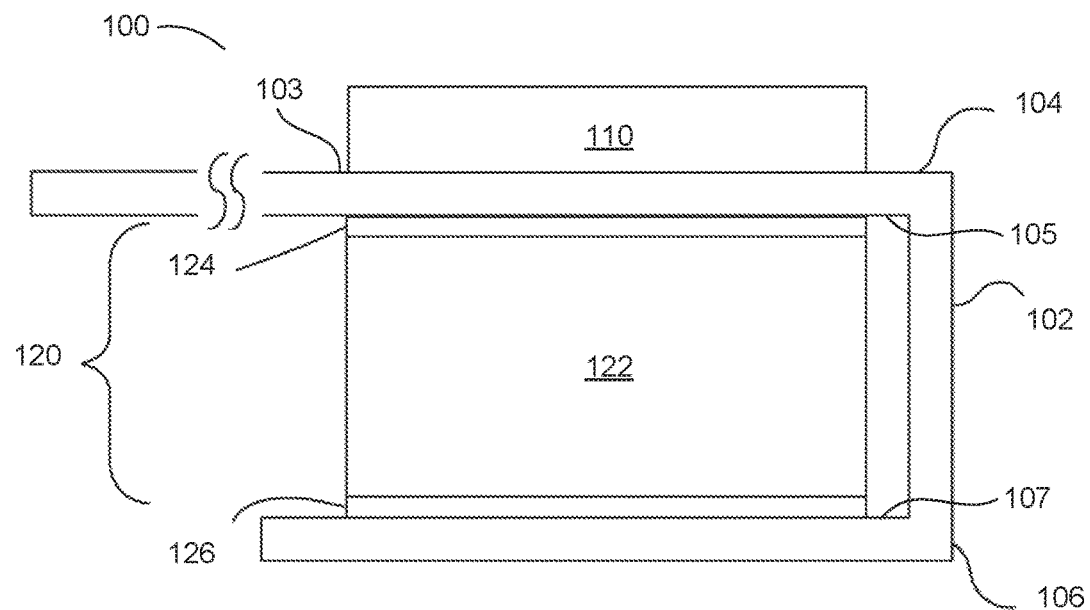
FIG. 1 illustrates an integrated input device comprising a fingerprint sensor and force sensor according to an embodiment of the disclosure.

Referring to FIG. 1, one embodiment of an integrated sensor 100 is shown. In the illustrated embodiment, the integrated sensor 100 comprises a flexible circuit 102, a fingerprint sensor 110 and a force sensor 120. The flexible circuit 102 comprises a first portion 104 and a second portion 106 and is configured such that the first portion 104 is over the second portion 106. The fingerprint sensor 110 is disposed on a first side 103 of the first portion 104, and the force sensor 120 is disposed at least partially between a second side 105 of the first portion 104 and a first side 107 of the second portion 106. In one embodiment, the force sensor 120 comprises a compressible layer 122, one or more force electrodes 124, and one or more force electrodes 126. Each of these elements is described below in greater detail and in connection with selected embodiments.

In one embodiment, the flexible circuit 102 functions as the backbone of the integrated sensor 100, providing a common substrate for supporting both the fingerprint sensor 110 and the force sensor 120. The flexible circuit 102 may also provide a substrate for routing traces which communicatively couple the force sensor 120 and the fingerprint sensor 110 to each other, and/or communicatively couple at least one of the force sensor 120 and the fingerprint sensor 110 to one or more other electronic components.

The flexible circuit 102 may include any suitable substrate material that has the flexibility to be bent or formed such that a first portion is over a second portion and is able to support a force sensor. In one embodiment, the flexible circuit 102 comprises a flexible foil having one or more conductive layers. In one embodiment, the flexible circuit 102 is a double sided flexible circuit having two conductive layers. Further, the flexible circuit 102 may comprise a polyimide film, such as Kapton®, Pyralux®, or the like. Other suitable flexible circuits are known and are commercially available.

In one embodiment, the flexible circuit 102 comprises a first portion 104 and a second portion 106. As is illustrated in FIG. 1, the first portion 104 is over the second portion 106. It should be understood that the term "over" is a relative term and describes the stacked relationship of the first and second portions relative to each other regardless of the overall orientation of the integrated sensor. For example, the integrated sensor 100 may be oriented vertically upside-down such that the first portion is below the second portion, and, in the context of this disclosure, the first portion is still over the second portion.

Figure 2A:
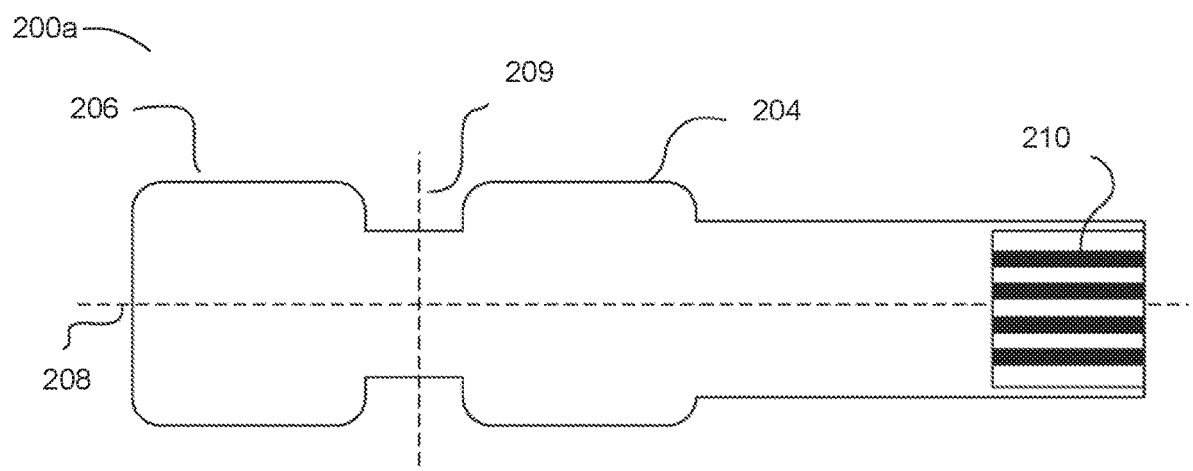
FIGS. 2A-3 illustrate an example flexible connector according to embodiments of the disclosure.
Figure 2B:
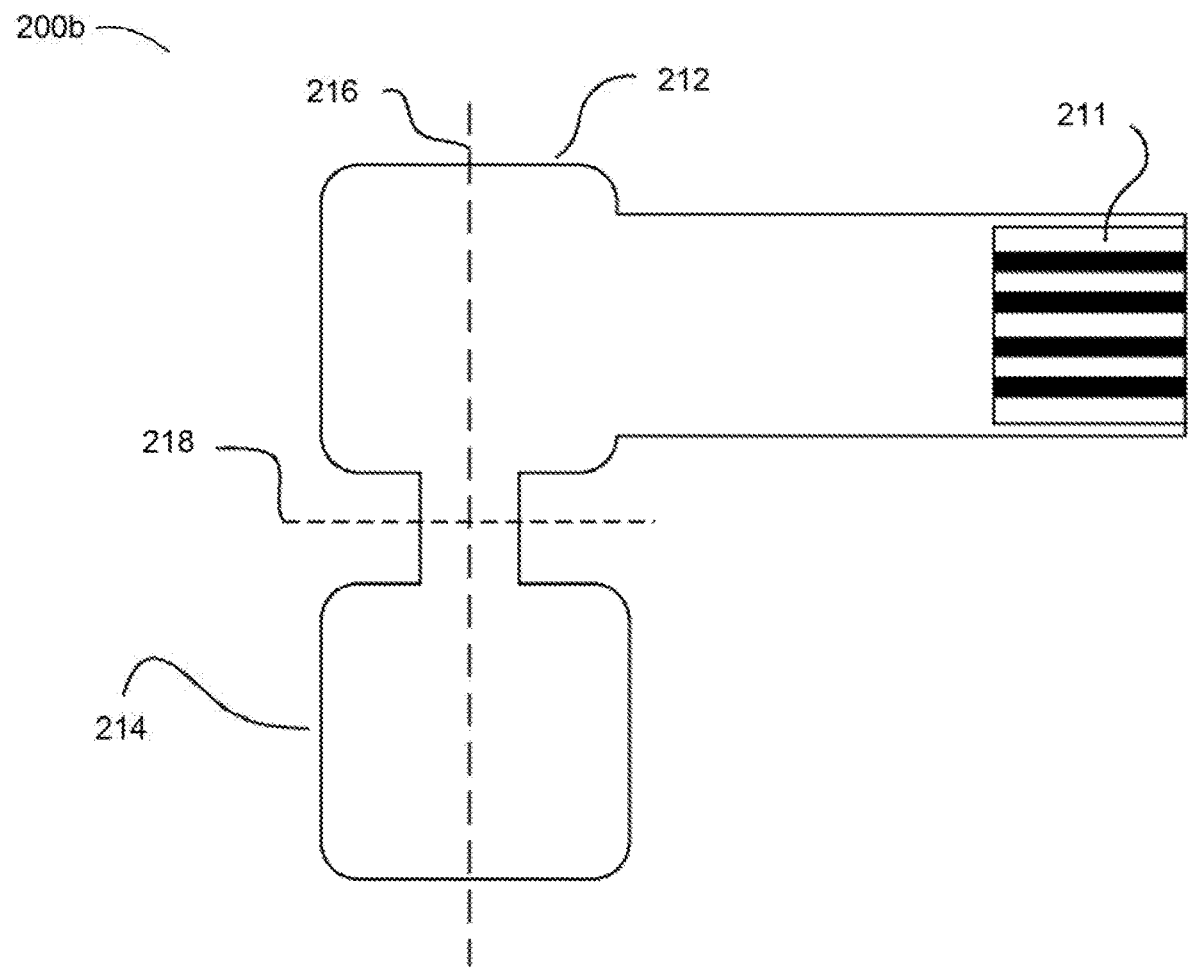

In one embodiment, a first portion and a second portion of a flexible circuit are arranged linearly. For example, as is shown in FIG. 2A, a first portion 204 and a second portion 206 are arranged along a linear axis 208. Likewise, in the embodiment illustrated in FIG. 2B, a first portion 212 and a second portion 214 are arranged along a linear axis 216. FIG. 2A further shows a connector 210 along the same linear axis 208 as the first portion 204 and the second portion 206, whereas FIG. 2B shows a connector 211 along a different axis from the linear axis 216 of the first portion 212 and the second portion 214.

In one embodiment, to configure the first portion over the second portion, the flexible circuit is bent (or folded) perpendicular to the linear axis along which the first and second portions are arranged. For example, as shown in FIG. 2A, a flexible circuit 200a is bent perpendicular to the linear axis 208 along axis 209. Likewise, a flexible circuit 200b may be bent perpendicular to linear axis 216 along axis 218 as shown in FIG. 2B. Bending a flexible circuit perpendicular to a linear axis in this manner positions the first portion over the second portion for integrated sensing, facilitating manufacturability. Further, this configuration tends to minimize the length of routing traces, which, in turn, tends to reduce electromagnetic interference of signals communicated over the routing traces. While not shown, in other embodiments, the flexible circuit may be bent and/or twisted in other ways, or bent along different axes, such that the first portion is above the second portion.

Figure 3:
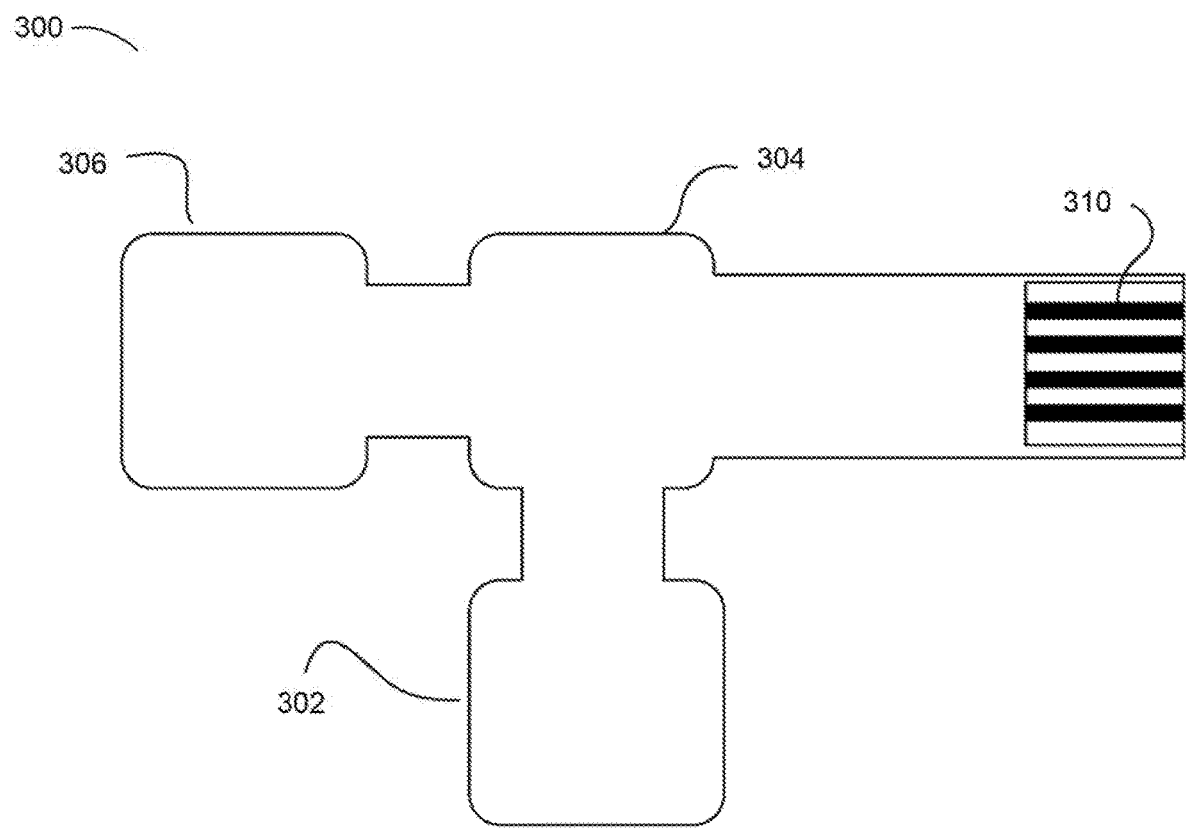

Referring to FIG. 3, a flexible circuit 300 may further comprise a third portion 302 for supporting an additional sensor. In one embodiment, one or more electrodes of a capacitive button are disposed on the third portion 302. The one or more electrodes of the capacitive button may be communicatively coupled to a processing system through one or more routing traces disposed on the flexible circuit 300. Further, the one or more electrodes of the capacitive button may be communicatively coupled to a host processor via routing traces and connector 310. The capacitive button may be configured to detect presence of an input object (e.g., a finger) to determine when a button press has occurred. In another embodiment, the capacitive button is further configured to detect hovering input objects and/or an approach and exiting direction of an input object which may be used to determine the validity of an input provided by input.

While the flexible circuit 300 of FIG. 3 is illustrated as having three portions (a first portion 304, a second portion 306 and third portion 302), in other embodiments, the flexible circuit 300 may comprise more than three portions. The additional portion(s) may support electrode(s) for additional capacitive button(s) and/or force electrode(s). Further, while the first portion 304 is illustrated as being a hub to which the second portion 306 and the third portion 302 are connected (the second portion 306 and the third portion 302 branch out from the first portion 304), in other embodiments, either the second portion 306, the third portion 302 or an additional portion may be connected to another point along flexible circuit 300. Further, in other embodiments, the different portions of the flexible circuit may be hub for other portions and the different portions of the flexible circuit may branch out in different ways. Further, in other embodiments, the shape and size of the different portions of the flexible circuit may vary. For example, portions that are intended to support a capacitive button may have a different shape and/or a different size than the portion that is intended to support the elements of the force sensor and/or fingerprint sensor.

Returning to FIG. 2A, in one embodiment, the flexible circuit 200a comprises a connector 210 (electrical connector). The connector 210 physically and electronically connects the flexible circuit 200a (and one or more components mounted on the flexible circuit 200a (e.g., the fingerprint sensor 110 and the force sensor 120) to one or more other electronic components (e.g., circuitry external to the integrated sensor or external computing device). In one embodiment, the connector 210 is configured to be connected to a connector of an external computing device such as a mobile phone, personal computer, laptop or tablet. Alternatively, the connector 210 may be configured to be connected to another input device, such as a touchpad, touch screen, mouse or keyboard. In one embodiment, as illustrated in FIG. 2A, the first portion 204 may be between the connector 210 and the second portion 206. However, in other embodiments, the second portion 206 may between the connector 210 and first portion 204. Although a connector is depicted in FIG. 2A, it should be understood that other embodiments are possible. For example, in one embodiment, the flexible circuit is spliced to or integrated with other components/circuits.

Returning to FIG. 1, the fingerprint sensor 110 is configured to detect changes in capacitive couplings between fingerprint electrodes. The fingerprint sensor may comprise a sensing array utilizing any suitable sensing technology to capture a fingerprint, such as capacitive, optical, acoustic, thermal, and the like. In some embodiments, the fingerprint sensor 110 comprises a plurality of fingerprint electrodes disposed in a one or two dimensional array and may be configured as a swipe sensor or a placement sensor. The fingerprint electrodes may be driven by a processing system to capture fingerprint image data or determine fingerprint information from the fingerprint sensor. Fingerprint information may include locations of minutia points, peaks and/or valleys of a fingerprint, ridge orientations, and the like. In one embodiment, the fingerprint sensor 110 comprises an integrated circuit (e.g., a fingerprint controller) and a plurality of fingerprint electrodes. The fingerprint electrodes may be formed on the integrated circuit or on a separate sensor substrate or substrates. In one embodiment, the plurality of fingerprint electrodes and integrated circuit may form a sensor package which is then mounted to the first portion 104.

In an embodiment, the fingerprint sensor 110 comprises a plurality of fingerprint electrodes disposed on the first portion 104, which is communicatively coupled to a controller disposed on another portion of the flexible circuit 102 or within an external electronic device.

In one embodiment, the force sensor 120 is configured to detect an input force based on changes in capacitance due to changes in distance between force electrodes. In one embodiment, the force sensor 120 comprises a compressible layer 122 and one or more force electrodes (the force electrode 124 and/or the force electrode 126). The compressible layer 122 is disposed between the first portion 104 and the second portion 106 in this embodiment. In one embodiment, the force sensor 120 is configured to provide one of binary and multi-level force information. As will be described in more detail later, one or more force electrodes are communicatively coupled to and driven by a processing system to detect a change in capacitance caused by an input force.

Figure 4A:
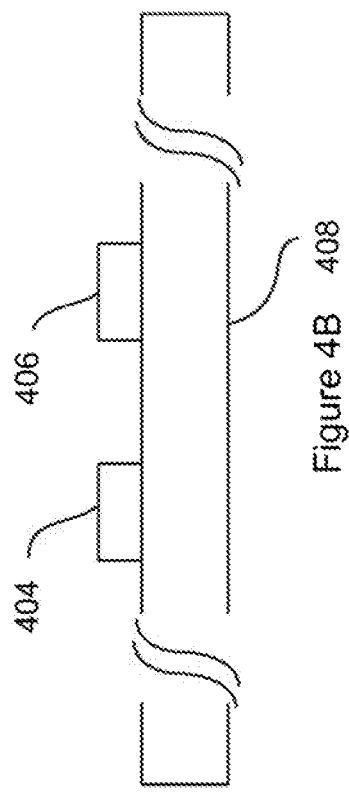
FIGS. 4A-4D illustrate exemplary layouts of force electrodes according to embodiments of the disclosure.
Figure 4B:
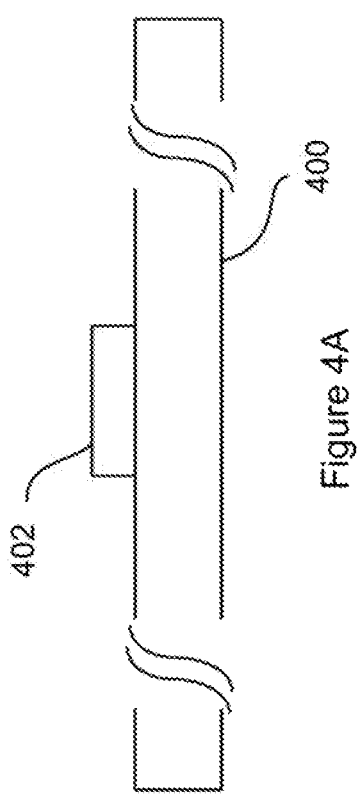
Figure 4D:
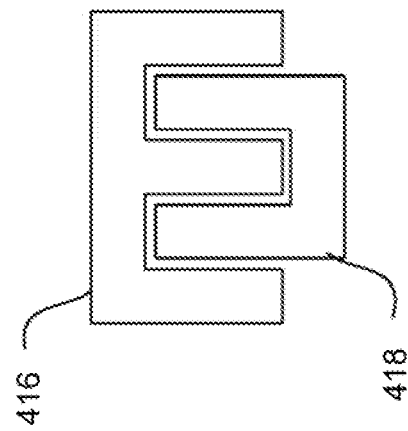
Figure 4C:
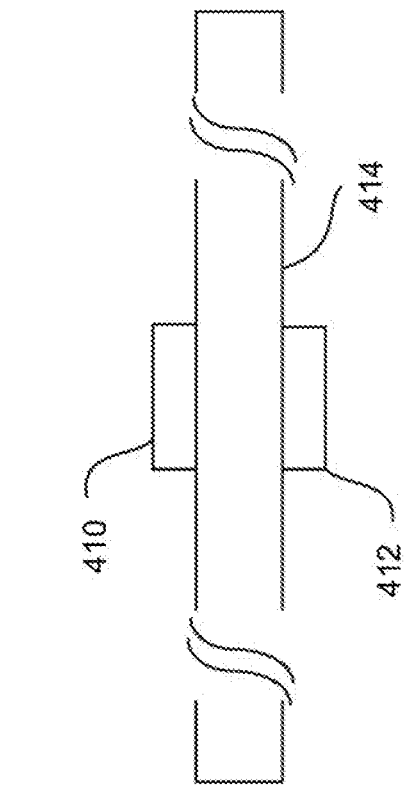

FIGS. 4A-4D show various configurations of force electrodes of a force sensor. As shown in FIG. 4A, the force sensor comprises a single electrode, force electrode 402, disposed on a first side of a second portion 400 of a flexible circuit. The force electrode 402 may be disposed on either side of the second portion 400. In the embodiment of FIG. 4B, the force sensor comprises force electrodes 404 and 406 disposed on a common side of the second portion 408. Force electrodes 404 and 406 may be disposed on either side of the second portion 408. In the embodiment of FIG. 4C, a force electrode 410 is disposed on a first side of a second portion 414 and a force electrode 412 is disposed on a second side of the second portion 414. The force electrode 410 and force electrode 412 may be vertically aligned or one of the force electrodes may be offset from the other. While two force electrodes are illustrated in the above embodiments, in other embodiments more than two force electrodes may be implemented. For example, the number for force electrodes disposed on a first portion of the flexible circuit may be greater than the number of force electrodes disposed on a second portion of the flexible portion. Further, the number of force electrodes on a first side of the flexible circuit may exceed the number for force electrodes on a second side of the flexible circuit. In one embodiment, the force electrode(s) may be printed on a flexible circuit or the force electrode(s) may be first printed on a separate substrate which is then disposed on the flexible circuit. Additionally, one or more of the force electrodes may comprise a conductive stiffener attached to the flexible circuit. In one embodiment, the force electrodes may comprise a similar size and/or shape. However, in other embodiments, the force electrodes may differ in size and/or shape. Further, as shown in FIG. 4D, the force electrodes (force electrodes 416 and 418) may be interdigitated with each other. The force electrodes may comprise any suitable conductive material, for example, copper, aluminum or indium tin oxide (ITO).

As is illustrated in FIG. 1, the force sensor 120 is disposed at least partially between the first portion 104 and the second portion 106, such that at least one element of the force sensor 120 is disposed between the first portion 104 and the second portion 106. In one embodiment, the compressible layer 122 and the force electrode 124 may be disposed between the first portion 104 and the second portion 106, while the force electrode 126 may or may not be disposed between the first portion 104 and the second portion 106. In another embodiment, each element of the force sensor 120 is disposed between the first portion 104 and the second portion 106. In such an embodiment, the force electrode 124, the compressible layer 122 and the force electrode 126 are all disposed between the first portion 104 and the second portion 106.

Alternatively, with further reference to FIG. 3, a first force electrode of force sensor 120 may be disposed on the second portion 306 and a second force electrode of force sensor 120 may be disposed on third portion 302. In one embodiment, the compressible layer 122 is sandwiched between the second portion 306 and third portion 302. In another embodiment, the compressible layer 122 is sandwiched between a first portion 304 and the second portion 306 and the third portion 302.

The compressible layer 122 is a resilient element that regulates a separating distance between the force electrode 124 and the force electrode 126. In one embodiment, the compressible layer 122 deforms in response to an input force applied to the fingerprint sensor 110, such that the force electrode 124 deflects toward the force electrode 126. The compressible layer 122 is further configured to return to its original form after an input force is removed from fingerprint sensor 110, thereby returning the force electrode 124 to its original position with respect to the force electrode 126.

The compressible layer 122 may be any suitable compressible structure including a continuous or discontinuous material and which may be characterized with a compressible stiffness such that it returns to its original state when a force is removed from the fingerprint sensor. In one embodiment, the force sensor 120 may be configured to respond multiple input force levels and parameters of the compressible layer 122 may be selected to provide the various force levels. Accordingly, in this embodiment, the stiffness and/or thickness of the compressible layer 122 is selected such that it deforms in response to a predetermined amount of input force. For example, the compressible layer 122 may be selected such that it does not deform under the weight of just the fingerprint sensor 110. Likewise, the threshold may be such that force sensor 120 responds to likely intended input of a user, but does not respond to likely unintended inputs. Examples of unintended inputs may comprise movement of a housing of the integrated sensor 100 or from an object that bumps the housing. For example, the threshold may be set such that the compressible layer 122 does not deform when keys in a pocket lightly bump against the integrated sensor.

FIGS. 4E-4G show various configurations of compressible layers of a force sensor, according to some embodiments. In FIG. 4E, the compressible layer 422a comprises a compressible solid material 429. In FIG. 4F, the compressible layer 422b comprises a compressible frame 433 (which may include a compressible solid material) bordering an air gap 435. In FIG. 4G, the compressible layer 422c comprises a compressible solid material 437 having vertically extending voids 439 (e.g., drilled holes). In one embodiment, the compressible solid material 437 has at least two voids. In other embodiments, the compressible solid material 437 includes more than two voids. In some embodiments, the solid materials in the embodiments shown in FIGS. 4E-4G comprise one or more of a foam (open or closed cell), silicone, and silicone microstructures. It should be understood that this is not an exhaustive list, and it will be appreciated that compressible structures other than those shown in FIGS. 4E-4G are suitable in other embodiments.

Referring to FIGS. 4E-4G, compression of the compressible layers 422a-c causes a distance between the force electrode(s) 124 and the force electrode(s) 126 to change, which in turn affects a capacitance that can be measured at one or more of these force electrodes. The response to an input force may be affected by parameters such as the stiffness of the compressible layer and permittivity of material(s) used in the compressible layer. This may render particular compressible structures or materials more or less suitable in various implementations depending on the particular sensing modality, sensitivity of the force sensing components, and the like. For example, the embodiment shown in FIG. 4E may allow for simplified manufacturing if the solid material has the desired stiffness and dielectric properties for the given sensor. As another example, the embodiment shown in FIG. 4F may allow for capacitive response to be tuned to the permittivity of air, while allowing for the frame to be made from materials having the desired stiffness without regard (or with less regard) to the frame's permittivity. That is, it allows the stiffness of the compressible layer to be selected independently of the dielectric properties of the compressible layer desired to achieve a particular response.

In one embodiment, force electrode 124 comprises a stiffener and is disposed on first portion 104 under fingerprint sensor 110. The stiffener functions to add rigidity to the force electrode 124 such that it remains in a planar state, even when being depressed.

Further, the force electrode 124 may be communicatively coupled to a processing system (e.g., the processing system 510). Such a configuration may be desirable in those embodiments where the force electrode 124 is active element of the force sensor 120. For example, as will be described in greater detail below, the force electrode 124 is communicatively coupled to processing system 510 when it is either driven with a substantially constant voltage, a transmitter signal, absolute capacitive sensing signal and/or operated as a receiver electrode.

Figure 5A:
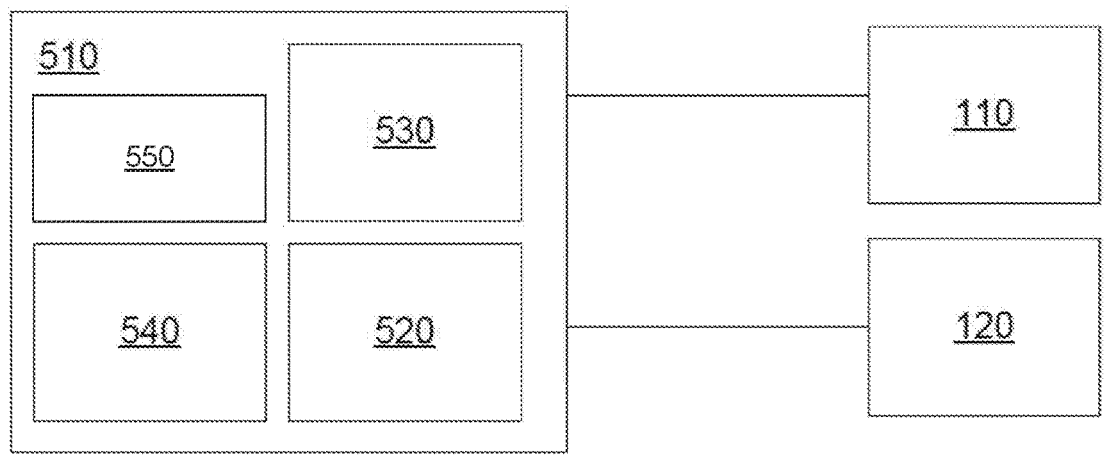
FIG. 5A-5C illustrate a processing system coupled with a force sensor and fingerprint sensor according to embodiments of the disclosure.

Referring to FIG. 5A, the fingerprint sensor 110 and the force sensor 120 of the integrated sensor 100 may be coupled to a processing system 510. The processing system 510 functions to receive and process information from the fingerprint sensor and/or force sensor. For example, the processing system 510 may convert raw signals from the fingerprint and/or force sensor into digital data, perform image processing functions, verify a fingerprint, and/or determine a threshold force applied to the force sensors. "Force information" as used herein is intended to broadly encompass force information regardless of format. For example, the force information can be provided as a vector or scalar quantity. As another example, the force information can be provided as an indication that determined force has or has not crossed a threshold amount. Further, the force information may comprise force information and can also include time history components.

In one embodiment, the processing system 510 includes sensor circuitry 520, force determiner 550, and fingerprint detector 540. In sensor circuitry 520 is configured to drive sensing signals onto and receive resulting signals from the force sensor electrodes. As will be described in greater detail below, in one embodiment, the sensor circuitry 520 is configured to drive a first force electrode with a transmitter signal and receive a resulting signal with a second force electrode. In another embodiment, the sensor circuitry 520 is configured to drive a first force electrode with an absolute capacitive sensing signal and receive a resulting signal from the same force sensing electrode. Further, the sensor circuitry 520 may be configured to drive one or more force electrodes with a constant voltage. In another embodiment, the sensor circuitry 520 may be configured to electrically float one or more force sensing electrodes. The sensor circuitry 520 may include one or more drivers, and/or integration amplifiers.

Force determiner 550 may be configured to determine force information from the resulting signals received with the force electrode. In one embodiment, the force determiner 550 processes the resulting signals to determine the force information. For example, the force determiner 550 may be configured to remove a baseline from the resulting signals, determine a first force value from the baselined resulting signals and compare the force value to one or more threshold values. In one embodiment, the force determiner 550 is configured to determine a total force value from baselined resulting signals. The force detector 530 includes one or more of analog to digital converters, filters, and/or other processing elements. Fingerprint detector 540 may be configured to determine one or more valleys and/or ridges to determine fingerprint information. In one embodiment, the sensor circuitry 520 is configured to drive one or more fingerprint electrodes and receive resulting signals from a second one or more fingerprint electrodes and the fingerprint detector 540 is configured to determine one or more valleys and/or ridges from the resulting signal. The fingerprint detector 540 may remove a baseline from the resulting signals before determining one or more valleys and/or ridges. In some embodiments, the processing system also comprises electronically-readable instructions such as firmware code, software code, and/or the like.

The processing system 510 may comprise one or more integrated circuits. In one embodiment, an integrated circuit of the processing system 510, the plurality of fingerprint electrodes and corresponding substrates are integrated in a single fingerprint sensor package. The integrated circuit may be a controller comprising a combination of hardware and software elements configured to drive, receive and process signals from the fingerprint sensor and/or force sensor.

In another embodiment, processing system 510 comprises a first integrated circuit disposed on a flexible circuit and coupled to a plurality of sensor electrodes of a fingerprint sensor via a plurality of routing traces disposed on the flexible circuit. In such an embodiment, the integrated circuit is mounted on a different portion of the flexible circuit than the fingerprint electrodes of the fingerprint sensor. The integrated circuit may also be communicatively coupled to the force electrode of a force sensor. The integrated circuit may be a controller that comprises a combination of hardware and software elements configured to drive and receive signals and from the fingerprint sensor and process the signals to determine changes in capacitive coupling to detect valleys and ridges of a fingerprint of a user.

In one embodiment, the processing system 510 is configured to operate the hardware of the force sensor 120 to determine measurements of force that may be used to determine force information. The processing system 510 may be configured in different ways and comprises parts of or all of one or more integrated circuits and/or other circuitry components. For example, in one embodiment, the processing system is configured for transcapacitive sensing and/or absolute capacitive sensing.

The processing system 510 may comprise two or more integrated circuits. For example, processing system may comprise a first integrated circuit coupled to fingerprint sensor and a second integrated circuit coupled to force sensor. The first and second integrated circuits may be controllers comprising any combination of hardware and software elements configured to drive, receive and process signals from the fingerprint sensor 110 and the force sensor 120. Both of the first and second integrated circuits may be disposed on a flexible circuit, such as flexible circuit 102. However, in other embodiments, only one of the first and second integrated circuits may be disposed on the flexible circuit. In yet other embodiments, neither of the first and second integrated circuits is disposed on the flexible circuit.

In one embodiment, the processing system 510 is configured to operate in a transcapacitive mode to measure a transcapacitance (or "mutual capacitance") between any two or more sensor electrodes of the fingerprint sensor 110 and/or force sensor 120. The processing system configured to operate in a transcapacitive mode comprises a one or more transmitters and one or more receivers communicatively coupled to electrodes of fingerprint sensor 110 and/or force sensor 120. In one embodiment, the one or more transmitters and the one or more receivers are part of sensor circuitry 520. The plurality of transmitters drive transmitter signals onto first sensor electrodes forming transmitter electrodes and receivers that receive resulting signals with second sensor electrodes forming receiver electrodes. The resulting signals comprise effects corresponding to the transmitter signals. Further, the resulting signals comprise effects corresponding to interference and any proximate input objects. The transmitter signal may be a varying voltage signal that is modulated with reference to the receiver electrodes. The transmitter signal may comprise a square waveform, a sinusoidal waveform, triangular waveform or the like. In one embodiment, the processing system 510 holds each receiver at a substantially non-varying voltage. In one or more embodiments, the substantially non-varying voltage is a ground, middle voltage of the transmitter signal, or any other substantially constant voltage. Further, the processing system 510 may drive a modulated signal onto the receiver electrodes as long as transmitter electrodes and receiver electrodes are modulated with respect to each other.

In one embodiment, a driver of the processing system 510 is communicatively coupled to the force electrode(s) 124 and drives the force electrode(s) 124 with a substantially constant voltage signal. The driver may be part of sensor circuitry 520. Further, a transmitter of the processing system 510 is communicatively coupled to one or more first force electrodes of the one or more force electrodes 126 and transmits a transmitter signal with the first force electrode(s). A receiver of the processing system 510 is communicatively coupled to and receives a resulting signal with one or more second force electrodes of the force electrode(s) 126. The resulting signal may be processed by processing system 510 to determine a change in transcapacitive coupling between the first and second force electrodes. A force measurement may be determined from the change in transcapacitive coupling. For example, when a force input is applied to fingerprint sensor, the compressible layer 122 compresses such that force electrode 124 deflects toward the first and second force electrodes. As force electrode 124 is held at a substantially constant voltage, it reduces the transcapacitive coupling between first and second force electrodes. In one embodiment, the force electrode 124 is electrically floating. In such an embodiment, the force electrode 124 is not driven by the processing system 510 and as an input object applies force to fingerprint sensor 110, the input object capacitively couples with the force electrode 124, essentially grounding the electrode. The compressible layer 122 compresses in response to the input force, deflecting force electrode 124 toward force the first and second force electrodes, reducing the capacitive coupling between the first and second force electrodes.

In another embodiment, a driver of the processing system 510 is communicatively coupled to the force electrode(s) 126 and drives the force electrode(s) 126 with a substantially constant voltage signal. Further, a transmitter of the processing system 510 is communicatively coupled to one or more first force electrodes of the one or more force electrodes 124 and transmits a transmitter signal with the first force electrode(s) of the force electrodes 124. A receiver of the processing system 510 is communicatively coupled to and receives a resulting signal with one or more second force electrodes of the force electrode(s) 124. The resulting signal may be processed by processing system 510 to determine a change in transcapacitive coupling similar to the manner described above.

In other embodiments, the processing system 510 transmits a transmitter signal with the force electrode(s) 126 and receives a resulting signal with the force electrode(s) 124. In another embodiment, the processing system 510 transmits a transmitter signal with the force electrode(s) 124 and receives a resulting signal with the force electrode(s) 126. In either of the above embodiments, as compressible layer 122 is compressed due to an input force, the transcapacitive coupling between the force electrodes 124 and 126 increases.

In one or more embodiments, processing system 510 is configured to operate at least one of the fingerprint sensor and force sensor in an absolute capacitive (or "self capacitance") sensing mode. In such an embodiment, a sensor electrode is modulated with an absolute capacitive sensing signal and a resulting signal is received from the same sensor electrode. The absolute capacitive sensing signal is a varying voltage signal modulated with reference to a ground voltage and comprises a square waveform, sinusoidal waveform, triangular waveform, or the like. The resulting signal comprises effects corresponding to the absolute capacitive sensing signal. The processing system 510 comprises driver circuitry for driving corresponding electrodes with absolute capacitive sensing signals and receivers for receiving resulting signals with the electrodes. The resulting signals may be processed by the processing system 510 to determine changes in absolute capacitance for the sensor electrodes. In one embodiment, by modulating the reference voltage of the receivers, the receivers are configured to both drive the sensor electrodes with absolute capacitive sensing signals and receive resulting signals with the one or more sensor electrodes.

The processing system 510 may be configured to drive absolute capacitive sensing signal onto and receive a resulting signal with the force electrode(s) 126. In embodiments where the force electrode(s) 126 comprises more than one force electrode (examples of which are shown in FIGS.

4B-4D) processing system may be configured to simultaneously drive and receive with each force electrode. In additional embodiments, the processing system 510 drives the force electrode(s) 124 with a substantially constant voltage signal or with a voltage signal such that it is modulated differently than the force electrode(s) 126. When an input force is applied to the fingerprint sensor 110, the compressible layer 122 compresses and the force electrode(s) 124 deflects towards the force electrode(s) 126. As the separation distance between the force electrodes decreases, the absolute capacitance of the force electrode 126 changes (e.g., increases). In some embodiments, the processing system 510 processes the resulting signal received with the force electrode 126 to determine a change in absolute capacitive coupling for the force electrode 126, and determine a measure of force from the change in absolute capacitive coupling. In one embodiment, the force electrode 124 may be electrically floated, where an input object applying an input force to the fingerprint sensor 110 capacitively couples to the force electrode 124, grounding the force electrode. As the force electrode 124 is deflected toward the force electrode 126, the absolute capacitance of the force electrode 124 is changed.

In other embodiments, the processing system 510 drives the force electrode 126 with a substantially constant (non-varying) signal and drives the force electrode 124 with an absolute capacitive sensing signal. When an input force is applied to the fingerprint sensor 110, the compressible layer 122 compresses and the force electrode 124 deflects towards the force electrode 126. As the separation distance between the two force electrodes decreases, the absolute capacitance of the force electrode 124 changes (e.g., increases).

In various embodiments, at least one element of an integrated circuit of the processing system 510 is shared between force sensing and fingerprint sensing. For example, they processing system 510 may comprise a shared receiver that receives signals from both a force electrode and a fingerprint electrode or a shared transmitter or driver that drive signals onto a force electrode and a fingerprint electrode. In one embodiment, each shared element switched between communicating with a force electrode and fingerprint electrode depending on the sensing mode of the processing system 510. For example, a receiver may be coupled to a force electrode during force sensing and to a fingerprint electrode during fingerprint sensing. In other embodiments, at least one shared element may simultaneously communicate with a force electrode and fingerprint electrode. For example, a receiver may simultaneously receive a resulting signal from a force electrode and a fingerprint electrode. The resulting signals may be processed to determine force information and fingerprint information. In one instance, the resulting signal comprises effects corresponding to transmitter signals, where the transmitter signals comprise a carrier signal modulated with corresponding digital codes. The resulting signal is demodulated using the digital codes to determine the force information and fingerprint information. Further, a transmitter may simultaneously transmit a transmitter signal with a force electrode and a fingerprint electrode.

Figure 5B:
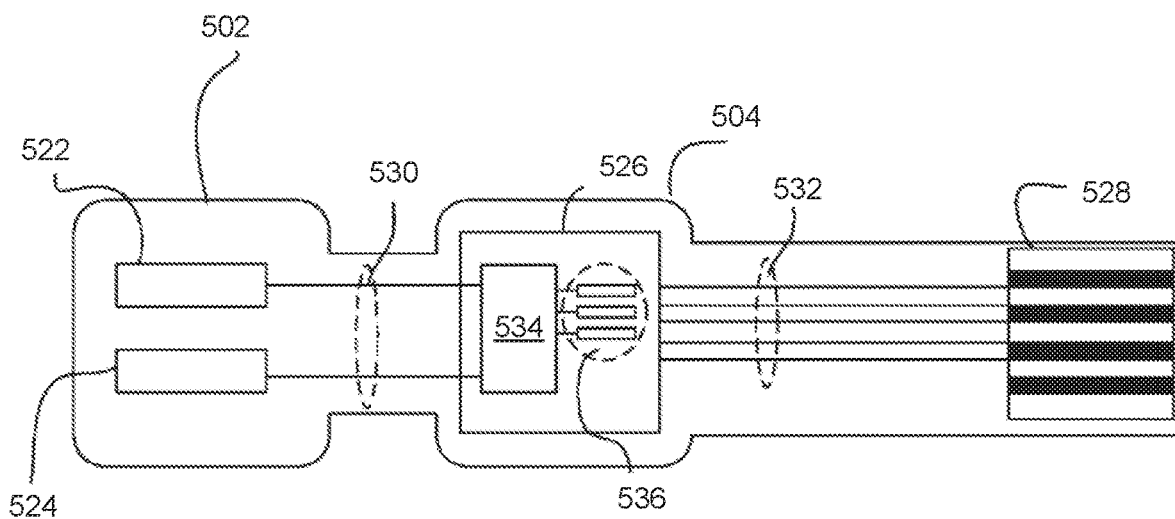

In the embodiment of FIG. 5B, a fingerprint sensor package 526 comprising an integrated circuit 534 and fingerprint electrodes 536 disposed on a first portion 504 of a flexible circuit 502. The integrated circuit 534 and fingerprint electrodes 536 are shown in FIG. 5B for illustrative purposes, and are not to limit the fingerprint sensor package 526 of FIG. 5B to any particular physical configuration. For example, the fingerprint sensor package 526 may have a stackup where the fingerprint sensor electrodes 538 are disposed on substrate above or next to the integrated circuit 534, or on a common substrate, and further any suitable number of electrodes may be included. The fingerprint sensor package 526 is coupled to a connector 528 via traces 532.

Force electrodes 522 and 524 are disposed on a second portion of the flexible circuit 502. The force electrodes may be disposed on any combination of sides of the second portion. As is illustrated, the force electrodes are coupled to the integrated circuit 534 of the fingerprint sensor package 526 through traces 530. In one embodiment, at least one of force electrodes 522 and 524 and fingerprint sensor electrodes 538 are coupled to common element of integrated circuit 534.

Figure 5C:
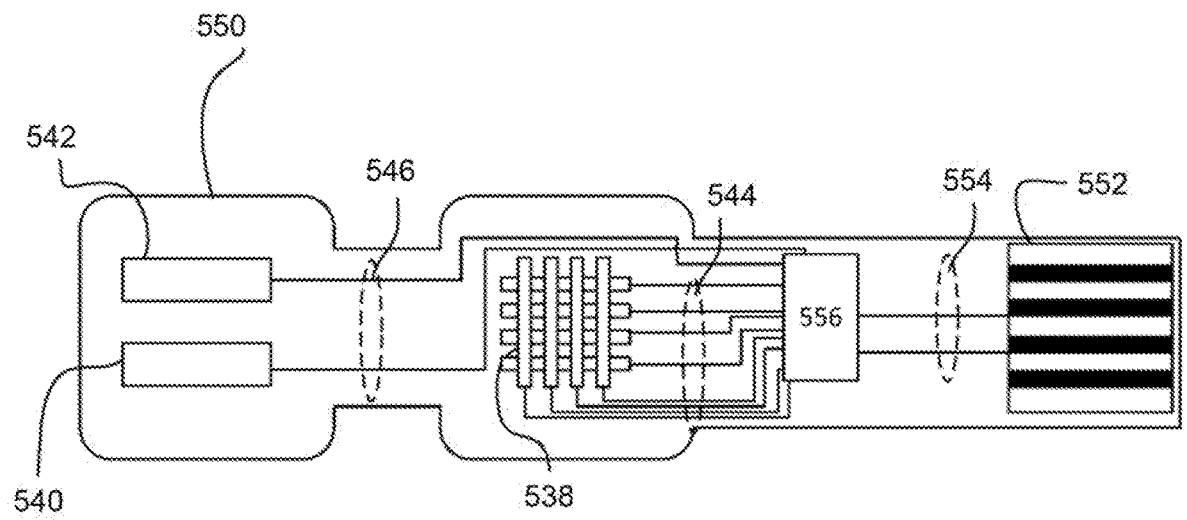

In the embodiment of FIG. 5C, fingerprint sensor electrodes 538 and force sensor electrodes 542 are coupled to an integrated circuit 556 via traces 544 and 546 respectively. As is shown, the integrated circuit 556 is disposed on a portion of flexible circuit 502 different from that of the force electrodes and fingerprint electrodes. Further, the integrated circuit 556 is coupled to connector 552 via traces 554. As is described in greater detail in other portions of this disclosure, one or more elements of the integrated circuit 556 may be shared between a force electrode and fingerprint electrode.

Figure 6:
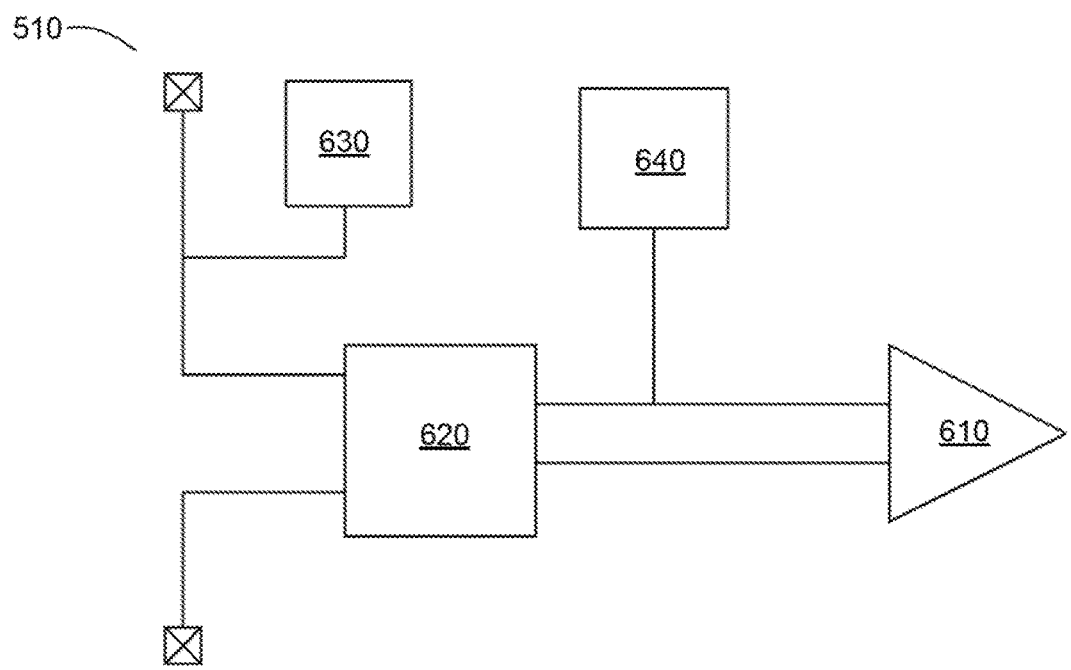
FIG. 6 illustrates an exemplary receiver of a processing system according to an embodiment of the disclosure.

With reference again to FIG. 5A, the processing system 510 may process the sensor signals. For example, the processing system 510 may perform filtering or other signal conditioning on resulting signals. In one particular embodiment in which a common receiver is used for both the fingerprint and force sensors, the processing system 510 may subtract or otherwise account for a baseline, such that the force information reflect a difference between the resulting signals and the baseline. For example, referring to FIG. 6, one embodiment of a shared receiver (receiver 600) is shown. The receiver 600 may comprises an amplifier 610, a switching mechanism 620, and baseline correctors (e.g., background capacitive correctors) 630 and 640. In a first mode, the switching mechanism 620 is coupled to a force electrode of the force sensor 120 and a fingerprint electrode of the fingerprint sensor 110. The switching mechanism 620 comprises one or more switches and is coupled to the amplifier 610, such that in a first mode, the switching mechanism 620 couples the fingerprint electrode to the amplifier 610 and in a second mode, switching mechanism 620 couples the force electrode to the amplifier 610.

In the first mode, the baseline corrector 640 subtracts a first capacitance from the input of the amplifier 610. In a second mode, the baseline corrector 640 subtracts a second capacitance from the input of the amplifier 610, where the second capacitance is greater than the first capacitance. Further, the baseline corrector 630 subtracts a third capacitance during the second mode. The third capacitance is significantly larger than the second capacitance. In one embodiment, the baseline corrector 630 may be coupled before the switching mechanism 620, such that switching mechanism 620 is between the baseline corrector 630 and the amplifier 610. In other embodiments, the baseline corrector 630 is coupled after the switching mechanism 620 and before the amplifier 610. In yet other embodiments, the baseline corrector 630 may be coupled to the input of the amplifier 610 through a switch, such that in the second mode the baseline corrector 630 subtracts the third capacitance from the input to the amplifier 610. In one embodiment, the baseline corrector 630 and the baseline corrector 640 may be combined into a single element able to subtract a first capacitance in the first mode and a second capacitance in the second mode. In such an embodiment, the second capacitance is significantly larger than the first capacitance.

Figure 7:
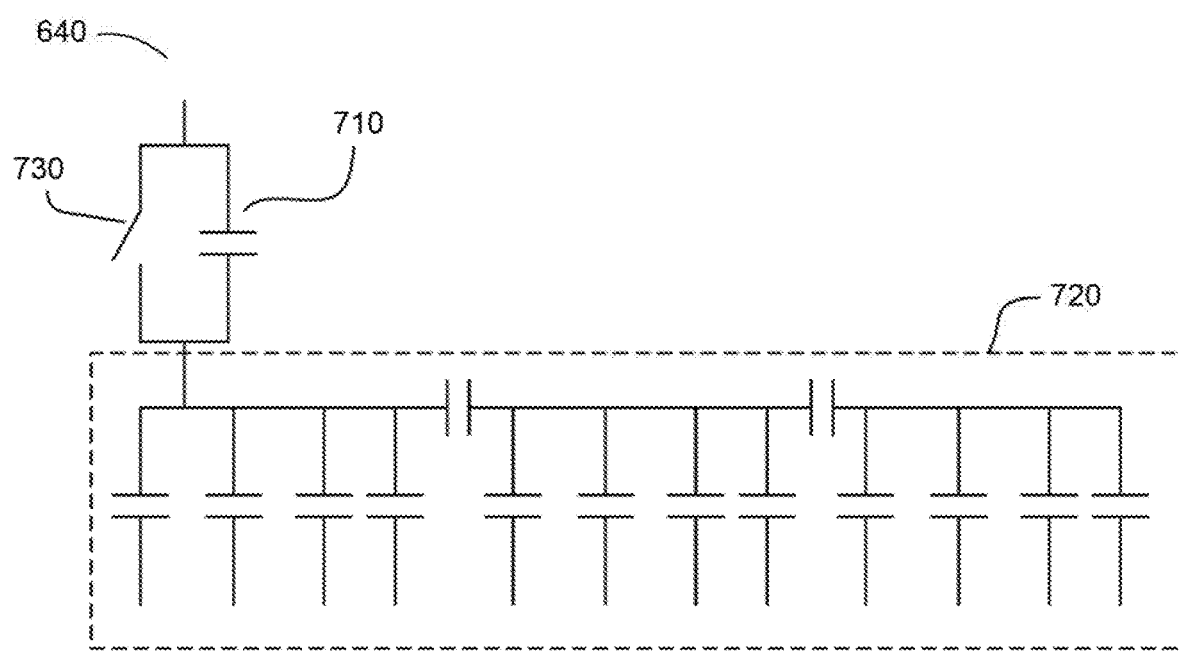
FIG. 7 illustrates a background corrector circuit according to an embodiment of the disclosure.

Referring to FIG. 7, one embodiment of the baseline corrector 640 is shown. In this embodiment, baseline corrector 640 comprises at least one capacitor. In various embodiments, baseline corrector 640 comprises a capacitor 710 coupled in series with at least capacitor 720. The capacitance of the first capacitor may be significantly smaller than the capacitance of the second capacitor(s). Further, while the capacitor 720 is illustrated has having a particular layout and number of capacitors, in other embodiments, other layouts and number may be implemented. In one embodiment at least a second capacitor 720 comprises more than two capacitors. The baseline corrector 640 further comprises a switch 730 coupled in series with at least the second capacitor 720 and in parallel with the capacitor 710. In a first mode, the switch 730 is open and the capacitor 710 dominates the capacitance of at least the second capacitor 720, producing the first capacitance. In a second mode, switch 730 is closed, shorting capacitor 710 and providing the second capacitance; the second capacitance equal to the capacitance of at least the second capacitor 720. In another embodiment, the baseline corrector 640 may comprise a first one or more capacitors and a second one or more capacitors, which may be selectively coupled to the input of the amplifier 610 to produce the first and second capacitances. In such an embodiment, the capacitance of the second one or more capacitors may be significantly larger than the capacitance of the first one or more capacitors.

Figure 8:
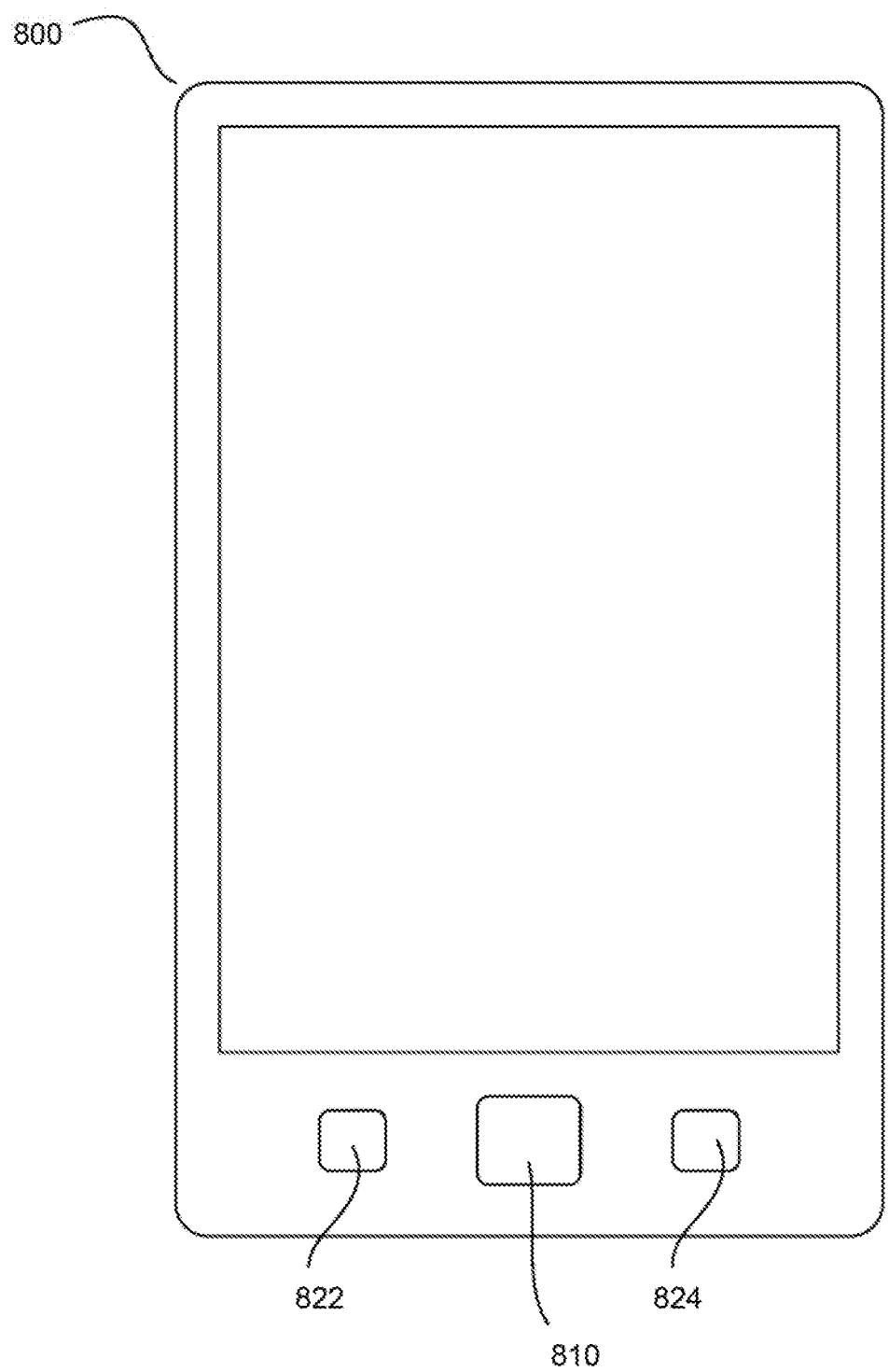
FIG. 8 illustrates an exemplary input device comprising an integrated sensor according to an embodiment of the disclosure.

FIG. 8 illustrates an input device 800 comprising an integrated sensor 810. The integrated sensor 810 comprises a fingerprint sensor and force sensor as described above. In one embodiment, the integrated sensor 810 is configured as an input button for the input device. For example, the integrated sensor 810 may provide an indication that a button press has occurred to a processor of the input device 800. Alternatively, the integrated sensor 810 may provide one of a determined force level and/or other force information to a processor of the input device, such that the processor may then determine whether a button press has or has not occurred.

The input device 800 may be a mobile phone or a tablet. In other embodiments, the input device 800 may be a personal computer, laptop or input device. In addition to the integrated sensor 810, the input device 800 may further comprise a touch sensitive display, one or more cameras, one or more movement based sensors, and/or one or more haptic feedback devices. In one or more embodiments, input device 800 further comprises one or both of buttons 822 and 824.

In one embodiment, the integrated sensor 810 functions to unlock the input device 800. In such an embodiment, the integrated sensor 810 provides an indication of a valid fingerprint to a processor of the input device 800. Further, the integrated sensor may provide an indication that the input force satisfies a threshold force level to the processor. In one embodiment, the input device 800 in unlocked once a valid fingerprint is identified and a force threshold is satisfied. In another embodiment, integrated sensor 810 provides at least partially processed fingerprint and/or force data to a processor of the input device 800. In such an embodiment, the processor of the input device 800 determines fingerprint and force information from the provided processed data.

In various embodiments, the integrated sensor 810 responds to user input (or lack of user input) directly by causing one or more actions. Example actions include changing operation modes, as well as GUI actions such as a selection and other function. In some embodiments, the integrated sensor 810 provides information about the input object to a processor of the input device 800.

In other embodiments, the integrated sensor 810 functions as a power button to the input device 800. In other embodiments, the integrated sensor 810 forms part of a volume control button of the input device 800. Further, while in the embodiment of FIG. 8, the integrated sensor 810 is shown as being positioned on the front of the input device below a display screen, in other embodiment, the integrated sensor 810 may position along a side or on the back of the input device 800. In other embodiment, the integrated sensor 810 may be included within a key of a keyboard or a button of a touchpad or mouse.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" are used as the plain-English equivalents of the respective terms "comprising" and "wherein." Moreover, in the following claims, the terms "first," "second," and "third," etc. are used merely as labels, and are not intended to impose numerical requirements on their objects.

What is claimed is:

1. A force sensing device comprising:
a flexible circuit comprising:
a first portion disposed over a second portion;
a fingerprint sensor disposed on a first side of the first portion and over the second portion, wherein the fingerprint sensor comprises a sensor package comprising:
an integrated circuit; and
fingerprint sensor electrodes communicatively coupled to the integrated circuit, and disposed on the first side of the first portion; and
a force sensor comprising:
a compressible layer disposed between a second side of the first portion and a first side of the second portion; and
one or more force electrodes.

2. The force sensing device of claim 1, wherein the flexible circuit further comprises:
a connector configured to be coupled to an external computing device, and wherein the first portion is between the second portion and the connector.

3. The force sensing device of claim 1, wherein the compressible layer comprises a solid material.

4. The force sensing device of claim 1, wherein the one or more force electrodes comprises:
a first force electrode disposed on the first side of the second portion; and
a second force electrode disposed on the second side of the first portion, and wherein the compressible layer is disposed between the first force electrode and the second force electrode.

5. The force sensing device of claim 1, wherein the one or more force electrodes comprises a first force electrode and a second force electrode disposed on the first side of the second portion, and the compressible layer is disposed between the first portion and the first and second force electrodes disposed on the second portion.

6. The force sensing device of claim 5, wherein the one or more force electrodes further comprises a third force electrode disposed on the second side of the first portion.

7. The force sensing device of claim 1, wherein the one or more force electrodes are communicatively coupled with the integrated circuit, and wherein the integrated circuit is configured to:
receive first resulting signals by driving the one or more force electrodes;
determine force information based on the first resulting signals;
receive second resulting signals by driving the fingerprint sensor electrodes; and
determine fingerprint information based on the second resulting signals.

8. The force sensing device of claim 1, wherein the flexible circuit further comprises:
an electrode of a capacitive button disposed on the flexible circuit.

9. An input device comprising:
a flexible circuit comprising:
a first portion disposed over a second portion;
a force sensor comprising:
a compressible layer disposed between a first side of the second portion and a second side of the first portion; and
one or more force electrodes; and
a fingerprint sensor disposed on the first side of the first portion, wherein the first portion opposes the second portion, and the fingerprint sensor comprises a sensor package comprising:
fingerprint sensor electrodes disposed on the first side of the first portion; and
an integrated circuit communicatively coupled to the one or more force electrodes and the fingerprint sensor electrodes, wherein the integrated circuit is configured to:
receive first resulting signals by driving the one or more force electrodes;
determine force information based on the first resulting signals;
receive second resulting signals by driving the fingerprint sensor electrodes; and
determine fingerprint information based on the second resulting signals.

10. The input device of claim 9, wherein the flexible circuit further comprises:
a connector configured to be coupled to an external computing device, and wherein the first portion is between the second portion and the connector.

11. The input device of claim 9, wherein the compressible layer comprises a solid material.

12. The input device of claim 9, wherein the one or more force electrodes comprises:
a first force electrode disposed on the second side of the first portion; and
a second force electrode disposed on the first side of the second portion, and wherein the compressible layer is disposed between the first force electrode and the second force electrode.

13. The input device of claim 9, wherein the one or more force electrodes comprises:

a first force electrode and a second force electrode disposed on the first side of the second portion, and the compressible layer is disposed between the second side of the first portion and the first side of the second portion.

14. The input device of claim 13, wherein the one or more force electrodes further comprises a third force electrode disposed on the second side of the first portion.

15. The input device of claim 9, wherein the integrated circuit comprises:
an amplifier; and
a switching mechanism having at least first and second modes, and connected to the amplifier, the switching mechanism is configured to couple a first fingerprint electrode of the fingerprint sensor electrodes to the amplifier when in the first mode, and couple a force electrode of the one or more force electrodes to the amplifier when in the second mode.

16. The input device of claim 9, wherein the flexible circuit further comprises:
a capacitive button disposed on the flexible circuit.

17. The input device of claim 9, wherein receiving the first resulting signals by driving the one or more force electrodes comprises driving a first one of the one or more force electrodes with an absolute capacitive sensing signal and receiving the first resulting signals with the first one of the one or more force electrodes.

18. The input device of claim 9, wherein receiving the first resulting signals by driving the one or more force electrodes comprises driving transmitter signals on a first one of the one or more force electrodes, and receiving the first resulting signals with a second one of the one or more force electrodes.

19. A processing system for an input device, the processing system comprises:
an integrated circuit disposed on a first side of a first portion of a flexible circuit, wherein the first portion of the flexible circuit is disposed over a second portion of the flexible circuit, wherein the integrated circuit is configured to:
receive first resulting signals by driving one or more force electrodes of a force sensor, wherein the force sensor comprises a compressible material disposed between a second side of the first portion and a first side of the second portion;
determine force information based on the first resulting signals;
receive second resulting signals by driving fingerprint sensor electrodes of a fingerprint sensor, wherein the fingerprint sensor electrodes are disposed on the first side of the first portion; and
determine fingerprint information based on the second resulting signals.

20. The processing system of claim 19, wherein the integrated circuit comprises:
an amplifier; and
a switching mechanism having at least first and second modes, and connected to the amplifier, the switching mechanism is configured to couple a first fingerprint electrode of the fingerprint sensor electrodes to the amplifier when in the first mode, and couple a first force electrode of the one or more force electrodes to the amplifier when in the second mode.

* * * * *